US010565280B2

(12) United States Patent
Parkinson et al.

(10) Patent No.: US 10,565,280 B2
(45) Date of Patent: Feb. 18, 2020

(54) WEBSITE CONTENT IDENTIFICATION IN A CONTENT MANAGEMENT SYSTEM

(71) Applicant: Disney Enterprises, Inc., Burbank, CA (US)

(72) Inventors: David Parkinson, Seattle, WA (US); Patrick Cook, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 737 days.

(21) Appl. No.: 13/857,371

(22) Filed: Apr. 5, 2013

(65) Prior Publication Data

US 2014/0304578 A1    Oct. 9, 2014

(51) Int. Cl.
G06F 17/00 (2019.01)
G06F 16/958 (2019.01)

(52) U.S. Cl.
CPC ................... G06F 16/958 (2019.01)

(58) Field of Classification Search
CPC .................................................. G06F 17/2247
USPC ................... 715/205, 234, 255, 204, 760
See application file for complete search history.

(56) References Cited

U.S. PATENT DOCUMENTS

| | | | | |
|---|---|---|---|---|
| 2002/0023112 A1* | 2/2002 | Avital | ..................... | G06F 17/21 715/234 |
| 2004/0148318 A1* | 7/2004 | Taylor et al. | ................. | 707/203 |
| 2005/0246627 A1* | 11/2005 | Sayed | ................... | G06F 17/248 715/234 |
| 2006/0123361 A1* | 6/2006 | Sorin | ................ | G06F 17/30873 715/854 |
| 2007/0288556 A1* | 12/2007 | Anton | ................ | H04N 21/2312 709/203 |
| 2009/0055755 A1* | 2/2009 | Hicks | .................... | G06F 16/958 715/760 |
| 2009/0094525 A1* | 4/2009 | Coelius et al. | ............... | 715/741 |
| 2009/0319955 A1* | 12/2009 | Malek | ............... | G06F 17/30014 715/854 |
| 2010/0251143 A1* | 9/2010 | Thomas et al. | ............... | 715/760 |
| 2011/0131482 A1* | 6/2011 | Shteinvil | ............... | G06F 17/218 715/229 |
| 2012/0072821 A1* | 3/2012 | Bowling | ....................... | 715/229 |
| 2013/0229531 A1* | 9/2013 | Zhang | ................. | H04N 17/002 348/187 |

(Continued)

Primary Examiner — Stephen S Hong
Assistant Examiner — Matthew J Ludwig
(74) Attorney, Agent, or Firm — Farjami & Farjami LLP

(57) ABSTRACT

There is provided a system and method for website content identification in a content management system. The method comprises receiving a first plurality of content identifications, wherein each of the first plurality of content identifications corresponds to each of a first plurality of contents and each of a first plurality of content paths in a content management system, determining a second plurality of content identifications, wherein each of the second plurality of content identifications corresponds to each of a second plurality of contents and each of a second plurality of content paths in the content management system, and displaying the first plurality of content identifications and the second plurality of content identification with corresponding webpage elements on a webpage. The method may further comprise receiving a selection of one of the content identifications and retrieving one of the contents or displaying one of the content paths based on the selection.

16 Claims, 5 Drawing Sheets

(56) References Cited

U.S. PATENT DOCUMENTS

| | | | |
|---|---|---|---|
| 2013/0262986 A1* | 10/2013 | Leblond | G06F 17/212 |
| | | | 715/236 |
| 2014/0215306 A1* | 7/2014 | Chiculita | G06F 17/248 |
| | | | 715/234 |
| 2014/0289650 A1* | 9/2014 | Cotlarciuc | 715/760 |
| 2015/0012562 A1* | 1/2015 | Hu | G06F 16/335 |
| | | | 707/769 |
| 2016/0101321 A1* | 4/2016 | Aragones | A63B 24/0006 |
| | | | 434/257 |

* cited by examiner

WEBSITE CONTENT IDENTIFICATION IN A CONTENT MANAGEMENT SYSTEM

BACKGROUND

Content creators, such as journalists, photographers, and writers, increasingly use Internet technology to distribute their content to audiences. The most common medium for content creators to display media in a place for people to visit and view the content is on websites. However, content creators are not necessarily versed in the methodology and technical skills required to code, design, and create websites. Thus, application site designers are often employed to display content using websites in a pleasing and desirable manner using content located in content management systems. Additionally, content editors may be used where very common or public websites contain content from a large population of content creators in order to edit, change, update, and/or remove content as necessary.

However, in such a system, a content editor and/or a content creator would either need to understand the content model of the website in order to locate content in a content management system, or would be required navigate a content graph if they wished to edit or change content. This can be time consuming or difficult for parties without an understanding of the construction of the website and the underlying content management system. Other content management systems may use "a what you see is what you get" model, however, rigid constraints to the model create difficulties in site updating and restructuring. Thus, application site designers become locked into one layout.

SUMMARY

The present disclosure is directed to website content identification in a content management system, substantially as shown in and/or described in connection with at least one of the figures, as set forth more completely in the claims.

DETAILED DESCRIPTION

Figure 1A:
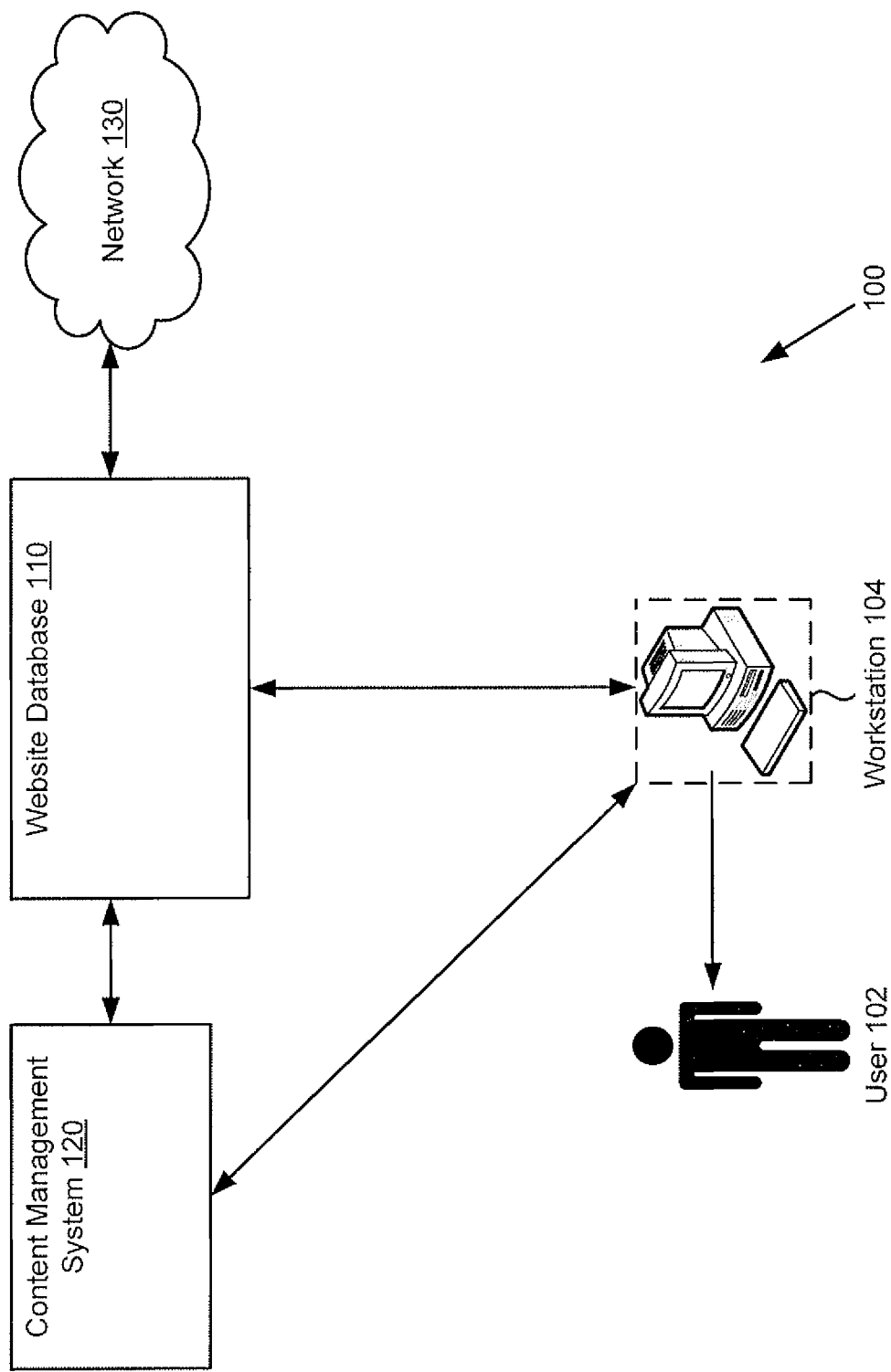
FIG. 1A presents an exemplary diagram of a system for website content identification in a content management system.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A presents an exemplary diagram of a system for website content identification in a content management system. System environment 100 of FIG. 1A shows user 102 utilizing workstation 104 to access a content editing application having a content identification framework with content identification features. Workstation 104 is connected to website database 110 which is also connected to content management system with workstation 104. Additionally, website database 110 is connected to network 130 for distribution of the one or more websites contained in website database 110.

As shown in FIG. 1A, user 102 may utilize workstation 104. Workstation 104 may correspond to a computing device, such as a server, desktop computer, laptop or mobile computer, or other computing device. Workstation 104 is connected to website database 110 in order to send and receive data corresponding to a website and associated webpages. Website database 110 may include data necessary for the rendering and display of a webpage. For example, website database 110 may include individual webpage data, such as webpage layouts, implementation data, and underlying content for display on the webpage. Additionally, website database 110 may include other website data such as the website design, navigation, and/or other website data.

Workstation 104 is connected to content management system 120. Content management system 120 may correspond to a system for publishing, editing, and managing content. Thus, content management system 120 may contain content for use with a website associated with website database 110. Content management system 120 is connected to workstation 104 in order to receive content and to edit content stored on content management system 120. Content management system 120 is also connected to website database 110. Content management system 120 may provide stored content for publishing to the associated website of website database 110. Both website database 110 and content management system 120 may further be connected to other workstations for the editing of the website and the publishing and editing of content.

Website database 110 is accessible over network 130 to retrieve a website and view the associated webpages. Network 130 may correspond to any network connection, such as a broadband network, wireless phone service communication network, or other network capable of sending of receiving data. Once accessed, other members of an audience may view content on a webpage through network 130, not shown in FIG. 1A.

User 102 may utilize workstation 104 to execute a content editing application. The content editing application may process website data received from website database 110. The content editing application may generally allow for editing of website content, such as the editing, updating, or removal of content on a website. However, using the content editing application, user 102 may also be able to access a content tagging feature and/or content identification feature available in a content identification framework. Using the content tagging feature and/or content identification feature, content on a website may be identified in a content management system so that an editor may access the underlying content and change the content.

Figure 1B:
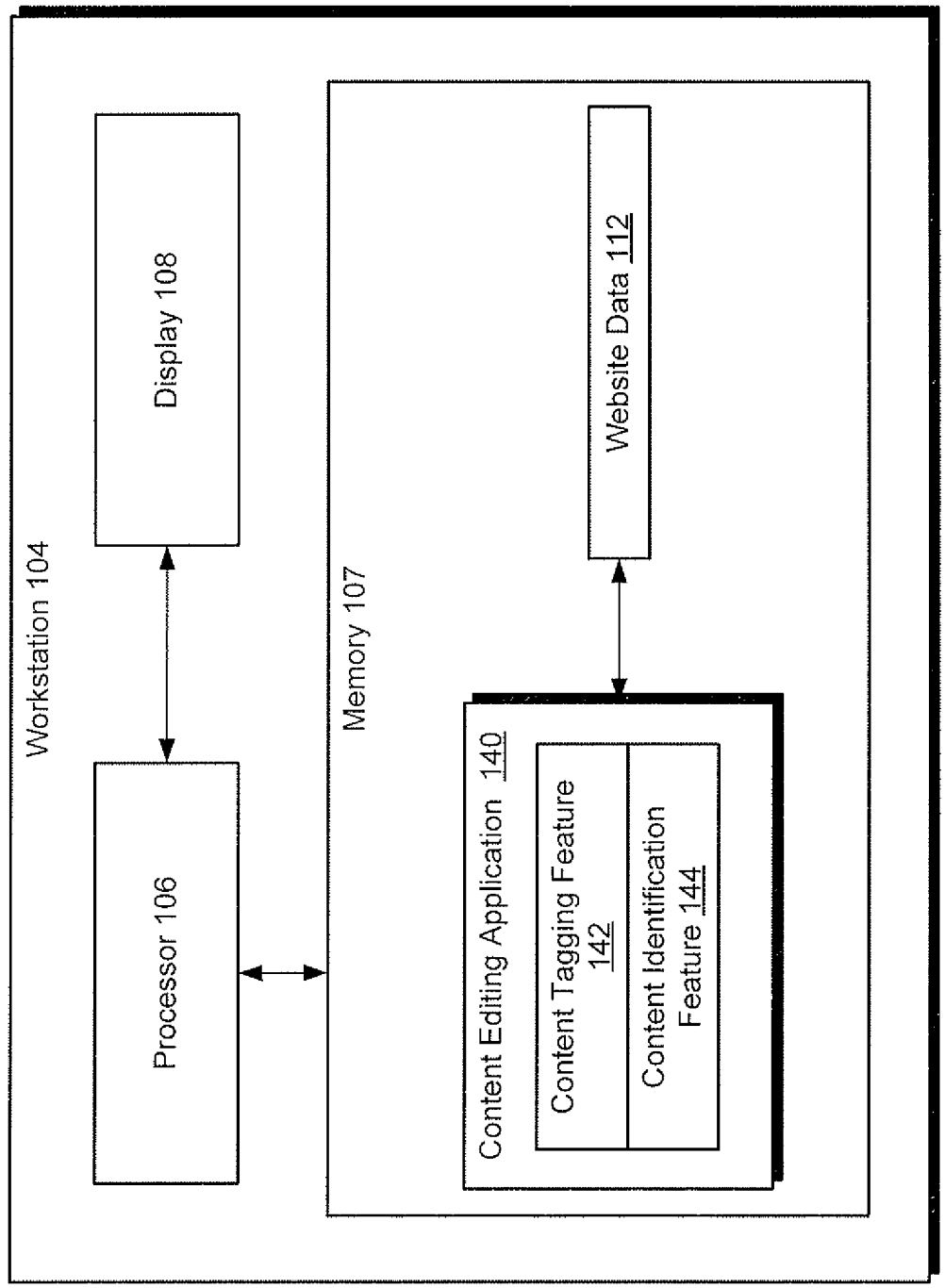
FIG. 1B shows a workstation containing a content editing application having content tagging features and content identification features.

Moving to FIG. 1B, FIG. 1B shows a workstation containing a content editing application having content tagging features and content identification features. Workstation 104 of FIG. 1B is shown with processor 106, memory 107, and display 108. Memory 107 of workstation 104 is shown with content editing application 140 having content tagging feature 142 and content identification feature 144. Additionally, memory 107 contains website data 112 for use with content editing application 140. Workstation 104 of FIG. 1B may correspond generally to workstation 104 of FIG. 1A.

Workstation 104 includes processor 106, memory 107, and display 108. Processor 106 is configured to access memory 107 to store received input and/or to execute commands, processes, or programs stored in memory 107. For example, processor 106 may receive data corresponding to a website and store the information in memory 107 as website data 112. Processor 106 may also access memory 107 and execute programs, processes, and modules stored in memory 107, such as content editing application 140. Additionally, processor 106 may store in memory 107 data resulting from executed programs, processes and modules. Processor 106 may correspond to a processing device, such as a microprocessor or similar hardware processing device, or a plurality of hardware devices. However, in other implementations, processor 106 refers to a general processor capable of performing the functions required by workstation 104.

Memory 107 of workstation 104 corresponds to a sufficient memory capable of storing commands, processes, and programs for execution by processor 106. Memory 107 may be instituted as ROM, RAM, flash memory, or any sufficient memory capable of storing a set of commands. In other implementations, memory 107 may correspond to a plurality memory types or modules. Thus, processor 106 and memory 107 contains sufficient memory and processing units necessary for workstation 104. Although memory 107 is shown as located on workstation 104, in other implementations, memory 107 may be separate but connectable to workstation 104, such as an external hard drive, USB flash drive, or other connectable memory unit.

Display 108 is connected to processor 106 of workstation 104 for rendering and output of content editing application 140 to a user. Display 108 may correspond to a visual display unit capable of presenting and rendering media content for a user. Display 108 may correspond to a liquid crystal display, plasma display panel, cathode ray tube, or other display. Processor 106 is configured to access display 108 in order to render content editing application and associated webpages and/or content for viewing by the user. While FIG. 1B shows display 108 as part of workstation 104, in other implementations, display 108 may be external to user device 250 or separate and connectable to user device 250. Additionally, display 108 may correspond to one visual display unit or a plurality of visual display unit.

Processor 106 may access memory 107 to execute content editing application 140. Content editing application 140 may correspond to an application, processes, and/or procedures containing a framework for editing content on a website and associated webpages. For example, content editing application 140 may allow for a user to move, edit, remove, or otherwise alter content displayed on a webpage. Additionally, content editing application 140 may include processes for editing the layout of content on a webpage, including content, banners, links, or other layout preferences. Content editing application 140 may include further processes to edit a website structure or navigation layout, or otherwise website features. Content editing application 140 may be utilized with received website data 112 from a website database, and may provide edited website data to the website database.

In addition to website editing features, content editing application 140 further includes content tagging feature 142 and content identification feature 144. Content tagging feature 142 corresponds to a feature usable in content editing application 140 that allows explicit tagging of elements on a webpage, such as webpage links, pictures, and/or content. Content tagging feature 142 allows a user designing and/or editing the webpage to directly link the tagged webpage element to content in a content management system. Thus, when the webpage is viewed using content editing application 140, the tagged element will be shown, and the underlying content in the content management system, as well as a path to the content in the content management system, can be found and displayed to a user.

Content identification feature 144 corresponds to a similar feature usable by content editing application 140. Content identification feature 144 includes a feature to recognize elements in a webpage, such as content, dynamically, such as by matching regular expression (regex) patterns configurable in content identification feature 144. Content identification feature 144 may include algorithmic prediction to determine webpage elements determined to be content.

Figure 2:
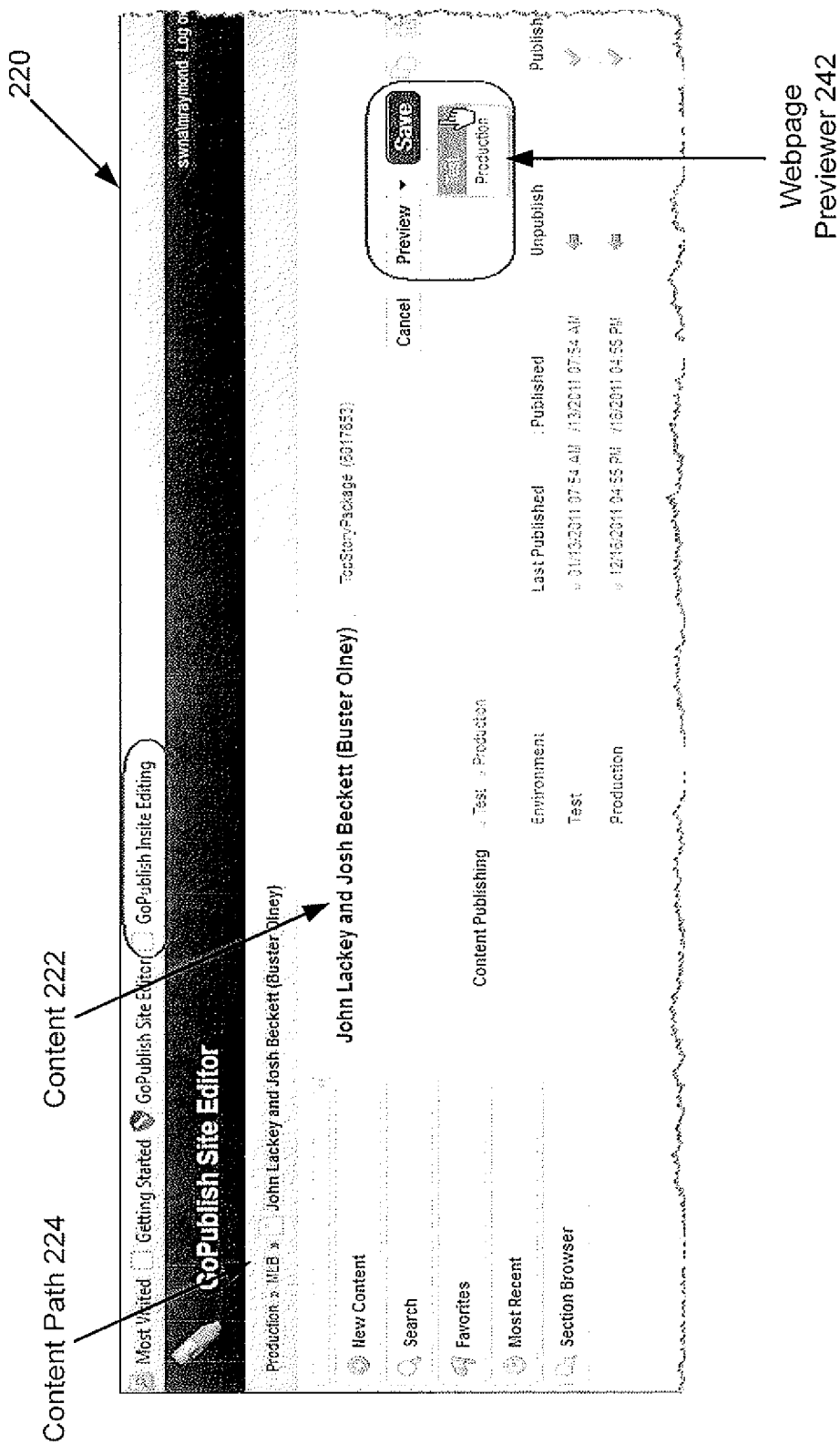
FIG. 2 shows a sample content management system for use with a website having identified content.

FIG. 2 shows a sample content management system for use with a website having identified content. As seen in FIG. 2, content management system 220 shows content 222 with content path 224 available in content management system 220 and webpage previewer 242. As shown in FIG. 2, content 222 is open in the content management system, allowing a user is able to edit, delete, update, or otherwise change content 222. The user is able to see additional information on content 222, such as content path 224, as well as update history, publishing dates, and/or other information. Content path 224 may display a navigation path to content 222 in content management system 220.

A user is also able to select webpage previewer 242 in order utilize a framework enabling viewing a webpage with content identifications corresponding to content 222. Webpage previewer 242 may allow the user to view the webpage with the content identifications, such as by highlighting webpage elements corresponding to the content identifications. For example, webpage previewer 242 may employ a framework enabling highlighting of webpage elements corresponding to content identifications. The content identification may correspond to tagged content identifications, such as a predetermined selection of a webpage element by a website designer corresponding to content in content management system 220, and/or discovered content identification, for example using an algorithmic prediction model. Such content identifications are shown with reference to FIG. 3.

Figure 3:
FIG. 3 present an exemplary webpage using a content identification framework for identifying content in a content management system.

Moving to FIG. 3, FIG. 3 present an exemplary webpage using a content identification framework for identifying content in a content management system. According to FIG. 3, webpage 350 shows mode selection 344 and displaying tagged content identification 346 and discovered content identification 348. Webpage 350 may correspond generally to a webpage displayed with a content identification framework and containing content, such as content 222 from content management system 220 of FIG. 2.

In one implementation, a user of a content management system may select to preview a webpage when viewing, publishing, or editing content, such as in FIG. 2. Once a user has selected to preview a webpage, webpage 350 may then be displayed to the user. Webpage 350 further displays mode selection 344 allowing for the user to edit content on webpage 350 or to select webpage elements on webpage 350. Webpage elements may correspond to selectable links on webpage 350, such as a selectable link corresponding to tagged content identification 346 and/or discovered content identification 348. If the user chases to select webpage elements on webpage 350, the user may navigate webpage 350.

However, if the user chooses edit in mode selection 344, the user may view content identifications, such as tagged content identification 346 and/or discovered content identifications 348. Tagged content identification 346 may correspond to explicitly tagged webpage elements having corresponding content, for example by a website designer or application site designer. When content is added to webpage 350 as a webpage element, it may be explicitly tagged to the underlying content management system. Thus, when the user selects edit in mode selection 344 tagged content identification 346 may be displayed to the user as highlighted, boxed, or other accented webpage elements.

Additionally, the content identification framework may display discovered content identification 348. Discovered content identification 348 may correspond to discovered webpage elements having corresponding content that are determined using the content identification framework. For example, the content identification framework may use an algorithmic prediction or other analysis tool to determine that webpage elements correspond to particular content in a content management system. Thus, the user may then see discovered content identification 348 as additionally highlighted, boxed, or other accented webpage elements. The webpage element accenting may be the same, or may be different than the accenting used for tagged content identification 346.

Viewing tagged content identification 346 and/or discovered content identification 348, a user may move a cursor over, select, or otherwise interact with the highlighted webpage elements. When interacting with the highlighted webpage elements, an interactive box and/or text may appear. The interactive box and/or text may display to the user the underlying content in the content management system, a link to the underlying content in the content management system, or a content path to the content in the content management system. The user may select the content, link, or content path to enable further options, such as linking to content 222 and content management system 220 of FIG. 2. Thus, the user may quickly link and edit, delete, or otherwise change content in a content management system quickly and efficiently.

Figure 4:
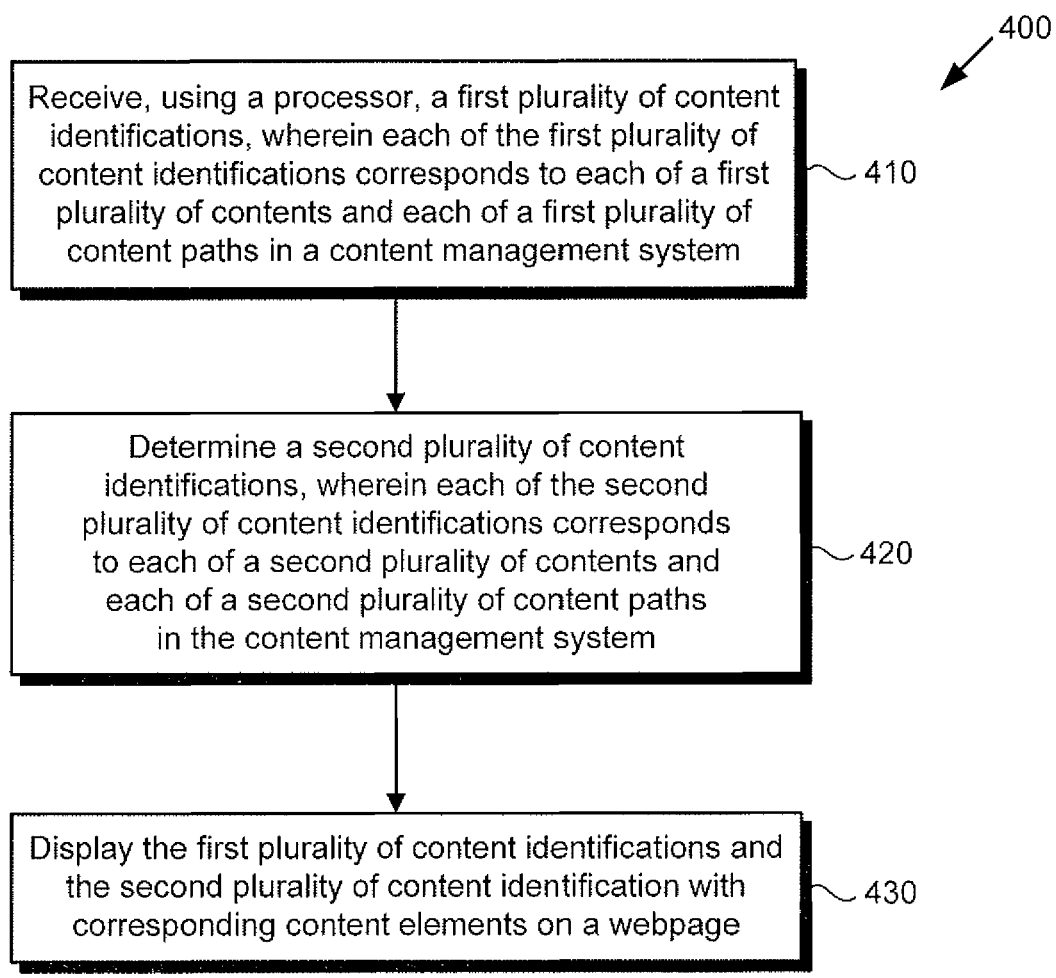
FIG. 4 presents an exemplary flowchart illustrating a method for website content identification in a content management system.

FIG. 4 presents flowchart 400 illustrating a method for website content identification in a content management system. At operation 410, a first plurality of content identifications 346 is received, for example, by processor 106 of workstation 104. The first plurality of content identification 346 corresponds to each of a first plurality of contents 222 and each of a first plurality of content paths 224 in a content management system 120/220. The first plurality of content identifications 346 may be received from a website designer when creating and/or editing a webpage 350. The first plurality of content identification 346 may be tagged using a content tagging feature 142 of a content editing application 140.

At operation 420, a second plurality of content identifications 348 is determined, for example, by processor 106 of workstation 104. The second plurality of content identification 348 corresponds to each of a second plurality of contents 222 and each of a second plurality of content paths 224 in a content management system 120/220. The second plurality of content identifications 348 may be determined using a content identification framework of a content editing application 140, such as a content identification feature 144. The second plurality of content identifications 348 may be determined when a user 102 attempts to edit content on a webpage 350, such as by selecting an edit mode in a mode selection 344 when viewing the webpage 350 using a content editing application 140.

At operation 430, the first plurality of content identifications 346 and the second plurality of content identifications 348 are displayed, for example, by processor 106 on display 108 of workstation 104. The first plurality of content identifications 346 and the second plurality of content identifications 348 are displayed with corresponding webpage elements, such as links, photographs, or other webpage elements, on a webpage 350.

Thus, using a content editing application with content identification framework, a user who is not well versed in website design and implementation may quickly find content in an underlying content management system. This provides flexibility in construction of the website, and ease in editing underlying content without adhering to strict construction rules or difficult content management system navigations.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system including a processor, the method comprising:
receiving, using the processor, a first plurality of content identifications tagged by a content tagging tool of a content editing application, wherein each of the first plurality of content identifications corresponds to each of a first plurality of contents and each of a first plurality of content paths in a content management system, wherein each of the first plurality of content paths is associated with a corresponding first navigation path for each of the first plurality of contents, and wherein each of the first plurality of contents is associated with a first plurality of webpage elements;
determining a second plurality of content identifications using an algorithmic prediction of a content identification tool of the content editing application, wherein each of the second plurality of content identifications corresponds to each of a second plurality of contents and each of a second plurality of content paths in the content management system, wherein each of the second plurality of content paths is associated with a corresponding second navigation path for each of the second plurality of contents, and wherein each of the second plurality of contents is associated with a second plurality of webpage elements;
displaying the first plurality of content identifications and the second plurality of content identifications with the first plurality of webpage elements and the second plurality of webpage elements on a webpage;
displaying, via the content editing application, a mode selection to a user of the content editing application;

receiving, from the user of the content editing application, a selection of an edit mode of the mode selection;

in response to the selection of the edit mode by the user, accenting the first plurality of content identifications and the second plurality of content identifications on the webpage to indicate editability of the first plurality of contents and the second plurality of contents;

receiving edits to at least one of the first plurality of contents and the second plurality of contents from the user viewing the accented first plurality of content identifications and the accented second plurality of content identifications displayed on the webpage; and updating the at least one of the first plurality of contents and the second plurality of contents, in response to the edits received from the user.

2. The method of claim 1 further comprising:

prior to the receiving of the edits from the user, receiving a selection of one of the accented first plurality of content identifications and the accented second plurality of content identifications.

3. The method of claim 2, further comprising:

prior to the updating, retrieving one of the first plurality of contents and the second plurality of contents based on the selection.

4. The method of claim 2 further comprising:

displaying one of the first plurality of content paths and the second plurality of content paths based on the selection of one of the accented first plurality of content identifications and the accented second plurality of content identifications.

5. The method of claim 1, wherein the receiving the first plurality of content identifications includes user input selecting the first plurality of webpage elements on the webpage.

6. The method of claim 5, wherein the user input further includes data input corresponding to the content path in the content management system.

7. The method of claim 1, wherein the accenting used for the first plurality of content identifications is different than the accenting used for the second plurality of content identifications.

8. The method of claim 1, wherein the first plurality of webpage elements and the second plurality of webpage elements include selectable hyperlinks to a webpage content corresponding to one of the first plurality of contents and the second plurality of contents.

9. A system comprising:

a processor;

and a display;

wherein the processor is configured to:

receive a first plurality of content identifications tagged by a content tagging tool of a content editing application, wherein each of the first plurality of content identifications corresponds to each of a first plurality of contents and each of a first plurality of content paths in a content management system, wherein each of the first plurality of content paths is associated with a corresponding first navigation path for each of the first plurality of contents, and wherein each of the first plurality of contents is associated with a first plurality of webpage elements;

determine a second plurality of content identifications using an algorithmic prediction of a content identification tool of the content editing application, wherein each of the second plurality of content identifications corresponds to each of a second plurality of contents and each of a second plurality of content paths in the content management system, wherein each of the second plurality of content paths is associated with a corresponding second navigation path for each of the second plurality of contents, and wherein each of the second plurality of contents is associated with a second plurality of webpage elements;

display on the display the first plurality of content identifications and the second plurality of content identifications with the first plurality of webpage elements and the second plurality of webpage elements on a webpage;

display, via the content editing application, a mode selection to a user of the content editing application;

receive, from the user of the content editing application, a selection of an edit mode of the mode selection;

in response to the selection of the edit mode by the user, accent the first plurality of content identifications and the second plurality of content identifications on the webpage to indicate editability of the first plurality of contents and the second plurality of contents;

receive edits to at least one of the first plurality of contents and the second plurality of contents from the user viewing the accented first plurality of content identifications and the accented second plurality of content identifications displayed on the webpage; and update the at least one of the first plurality of contents and the second plurality of contents, in response to the edits received from the user.

10. The system of claim 9, wherein prior to the receiving of the edits from the user, the processor is further configured to receive a selection of one of the first plurality of content identifications and the second plurality of content identifications.

11. The system of claim 10, wherein prior to the updating, the processor is further configured to retrieve one of the first plurality of contents and the second plurality of contents based on the selection.

12. The system of claim 10, wherein the processor is further configured to display one of the first plurality of content paths and the second plurality of content paths based on the selection of one of the accented first plurality of content identifications and the accented second plurality of content identifications.

13. The system of claim 9, wherein the processor receives the first plurality of content identifications including user input selecting the first plurality of webpage elements on the webpage.

14. The system of claim 13, wherein the user input further includes data input corresponding to the content path in the content management system.

15. The system of claim 9, wherein the accenting used for the first plurality of content identifications is different than the accenting used for the second plurality of content identifications.

16. The system of claim 9, wherein the first plurality of webpage elements and the second plurality of webpage elements include selectable hyperlinks to a webpage content corresponding to one of the content and the another content.

* * * * *